United States Patent Office 3,755,537
Patented Aug. 28, 1973

3,755,537
PROCESS FOR SEPARATING OLIGOMERS
FROM (NPCl₂) RUBBER
David Paul Tate, Northfield, Adel Farhan Halasa, Bath, and Gary Stephen Kyker, North Canton, Ohio, assignors to The Firestone Tire & Rubber Company, Akron, Ohio
No Drawing. Filed Oct. 29, 1971, Ser. No. 194,020
Int. Cl. C01b 25/10
U.S. Cl. 423—300    6 Claims

ABSTRACT OF THE DISCLOSURE

This invention relates to the preparation of purified phosphazene rubbers.

---

In the preparation of phosphazene rubbers, one method which has been recently proposed involves (a) the preparation and purification of $(NPCl_2)_3$ or $(NPCl_2)_4$, (b) polymerization of $(NPCl_2)$ trimer or tetramer to higher polymers and (c) reaction of the resulting polymers with fluorocarbon derivatives to produce the desired phosphazene rubbers. Since, for many purposes, liquid or semi-liquid derivatives are less desirable than solid products, the presence of trimer, tetramer, or other low molecular weight materials has been found to be undesirable. In the present specification the term oligomers will be used to identify low molecular weight polymers of $(NPCl_2)_n$ where $n$ is a small integer less than 7, usually 3 or 4. Further, reaction with these oligomers is wasteful of both the fluoro compound and of the oligomer which can be recovered and reused and which contaminates the desired phosphazene polymer product.

A principal object of this invention is to improve the economics of the process whereby the phosphazene polymers are produced.

Another object of the invention is to improve the properties of the resulting phosphazene rubbers.

A further object of the invention is to provide a simple and inexpensive procedure for the separation of unreacted trimer, tetramer and other oligomers from fully polymerized phosphazene rubbers.

Other objects of the invention are (1) to remove oligomers before the derivatization step and to thereby save time and solvents usually required in the removal of oligomers after derivatization; (2) to save expensive chemicals by derivatizing the high molecular weight polymer only; and (3) to recycle the trimer, tetramer and other oligomers to the polymerization step; for further polymerization.

The advantages are (1) costly reagents are used to derivatize only the desired "high molecular weight" fraction of the polymerization mixture; (2) involved separation of useful fraction from low molecular weight fraction after derivatization is avoided; (3) the polymerization mixture can be advantageously run to moderate conversions without experiencing gel formation and (4) by using the process of this invention, the unpolymerized trimer and tetramer and other oligomers may be recycled into the polymerization step.

In previously reported work in the field of phosphonitrilic chloride polymers and substituted polymers, the low molecular weight polymers and unreacted oligomers were separated from higher molecular weight products after derivatization, it being commonly believed that separation before derivatization would result in gelling of high molecular weight constitutents.

These and other objects of the invention will be pointed out or will be apparent from the description of a preferred embodiment of the invention, which follows.

In the separation process of the present invention the polymerized mass is dissolved in a solvent for the phosphazene rubber and oligomers and then a non-solvent for the polymer is added to the solution whereby the polymer is caused to separate into one phase separate from a second phase. The non-solvent is required to be miscible with the solvent. Mixtures of solvents and mixtures of non-solvents may be used in place of individual liquids.

The present invention will be better understood from the following preferred embodiment of the process of the present invention, given by way of example, and not intended to limit the invention in any way:

(1) $(NPCl_2)$ trimer, tetramer or mixture of oligomers was charged into a polymerization vessel and was polymerized in the usual way.

(2) The polymerized mixture was dissolved in a solvent for the same, so that the resulting solution was approximately 5–10% by weight solids. Toluene is a preferred solvent but other solvents, or mixture of solvents may be used and may even include small amounts of non-solvent as diluents.

(3) A suitable non-solvent for the polymer, selected from liquids miscible with the solvent was added to the solution until the polymer, still containing solvent and non-solvent separates into a separate phase. Preferred non-solvents are heptane and hexane. When using toluene, the ratio of heptane or hexane to toluene used was between 2:1 and 1:2, a preferred ratio being about 1.25:1. The ratio of solvent(s) to non-solvent(s) is selected so that the phase which contains the polymer is fluid or semi-liquid in order to simplify the subsequent processing and handling of the recovered polymer. Alternatively, increasing the ratio of non-solvent to solvent will transform the fluid polymer solution to a solid gum.

(4) The heptane layer was decanted from the oily toluene-polymer layer. At this stage, the polymer could be further compacted by washing with more heptane to give a solid gum, or if preferred the polymer could be completely dissolved in additional solvent (e.g. toluene).

(5) The heptane insoluble oily or solid gum was added to toluene and redissolved. The oily material was redissolved in several minutes, whereas the gum required several hours.

(6) The toluene-polymer composite was then used to prepare the derivatized product by reaction with appropriate reagents, e.g., as described in U.S. Pat. No. 3,515,688 or in U.S. Pat. No. 3,370,020.

(7) The heptane soluble material was recovered by evaporation of the heptane. Trimer, tetramer and other oligomers recovered from the heptane soluble material were recycled and were repolymerized as in step 1 above.

Other suitable solvents in addition to toluene which are preferred, include benzene, tetrahydrofuran, ethers, diglyme, triglyme and dioxane. Non-solvents miscible with these solvents include chloroform, carbon tetrachloride, butylchloride, and similar aliphatics.

What is claimed is:

1. A process for obtaining purified soluble polymers of $(NPCl_2)_n$ wherein $n$ is an integer greater than 7, which comprises: polymerizing $(NPCl_2)_y$ wherein $y$ is a small integer smaller than 7, to produce a polymer product of $(NPCl_2)_n$ in which $n$ is greater than 7; adding a first liquid to the product of said polymerization, said first liquid being one in which said polymer product is soluble and being selected from the group consisting of benzene, toluene and ethers, and thereafter adding a second liquid to the resulting mixture said second liquid being a liquid aliphatic hydrocarbon which is a non-solvent for said polymer product and which is miscible with said first liquid, to cause said polymer product to separate into two separate phases, one rich in polymer and one rich in oligomers, and recovering said polymer rich phase.

2. The process of claim 1 wherein the solvent is toluene and the non-solvent is selected from the group consisting of heptane, hexane and mixtures thereof.

3. The process of claim 1 including the step of recycling recovered oligomers to said reaction for further polymerization thereof.

4. The process of claim 1 wherein the first liquid is a solvent containing a small amount of non-solvent for said polymer.

5. The process of claim 4 wherein the second liquid contains a small amount of solvent for the polymers.

6. The process of claim 1 wherein the second liquid contains a small amount of solvent for the polymers.

References Cited

UNITED STATES PATENTS

| 2,998,297 | 8/1961 | Gregor et al. | 423—300 |
| 3,370,020 | 2/1968 | Allcook et al. | 423—300 X |
| 3,179,489 | 4/1965 | Becke | 423—300 |
| 3,367,750 | 2/1968 | Jaszka et al. | 423—300 |
| 3,379,510 | 4/1968 | Jaszka et al. | 423—300 |

OTHER REFERENCES

Chemical Abstracts: vol. 53, 12726g, 1959.

OSCAR R. VERTIZ, Primary Examiner

G. A. HELLER, Assistant Examiner